US011193869B2

United States Patent
Ma et al.

(10) Patent No.: US 11,193,869 B2
(45) Date of Patent: Dec. 7, 2021

(54) MAGNETIC POLE PART, FIBER-REINFORCED MATERIAL, TEST APPARATUS THEREFOR, AND CONTROL METHOD FOR TEST APPARATUS

(71) Applicant: BEIJING GOLDWIND SCIENCE & CREATION WINDPOWER EQUIPMENT CO., LTD., Beijing (CN)

(72) Inventors: Shengjun Ma, Beijing (CN); Wanshun Ma, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 550 days.

(21) Appl. No.: 16/088,305

(22) PCT Filed: Sep. 12, 2017

(86) PCT No.: PCT/CN2017/101347
§ 371 (c)(1),
(2) Date: Sep. 25, 2018

(87) PCT Pub. No.: WO2018/059225
PCT Pub. Date: Apr. 5, 2018

(65) Prior Publication Data
US 2020/0300742 A1    Sep. 24, 2020

(30) Foreign Application Priority Data
Sep. 30, 2016 (CN) .......................... 201610877233.9

(51) Int. Cl.
*G01N 13/02* (2006.01)

(52) U.S. Cl.
CPC ..... *G01N 13/02* (2013.01); *G01N 2013/0208* (2013.01)

(58) Field of Classification Search
CPC ..................... G01N 13/02; G01N 2013/0208
See application file for complete search history.

(56) References Cited

U.S. PATENT DOCUMENTS 7,181,986 B2    2/2007   Roth
8,858,070 B2    10/2014  Zaldivar et al.
(Continued)

FOREIGN PATENT DOCUMENTS

CN          2443365 Y      8/2001
CN        201282882 Y      8/2009
(Continued)

OTHER PUBLICATIONS

Ri Li, et al; "Solidification contact angles of molten droplets deposited on solid surfaces", J. Mater. Sci., Dec. 2007, vol. 42, Issue 23, pp. 9511-0523: Published online: Jun. 23, 2007.
(Continued)

*Primary Examiner* — Paul M. West

(57) ABSTRACT

A magnetic pole part, a fiber-reinforced material, a test apparatus therefor, and a control method for the test apparatus. The test apparatus comprises: a container provided with an adhesive agent container therein for containing an adhesive agent; a positioning member for positioning a member to be tested inside the container and partially inside the adhesive agent container; an adhesive agent heating member 912) for heating the adhesive agent; and an adhesive agent temperature sensor for measuring the temperature of the adhesive agent; a controller for turning on or off the adhesive agent heating member according to a temperature
(Continued)

signal detected by the adhesive temperature sensor so as to keep the adhesive agent in the adhesive agent container at a preset temperature.

19 Claims, 8 Drawing Sheets

(56) References Cited

U.S. PATENT DOCUMENTS

| | | | |
|---|---|---|---|
| 2011/0074380 A1 | 3/2011 | Jeon | |
| 2013/0270254 A1 | 10/2013 | Morgandi et al. | |

FOREIGN PATENT DOCUMENTS

| | | |
|---|---|---|
| CN | 102046864 A | 5/2011 |
| CN | 102494967 A | 6/2012 |
| CN | 202275039 U | 6/2012 |
| CN | 202421021 U | 9/2012 |
| CN | 103379677 A | 10/2013 |
| CN | 104155217 A | 11/2014 |
| CN | 104337298 A | 2/2015 |
| CN | 204165867 U | 2/2015 |
| CN | 104406892 A | 3/2015 |
| CN | 105334139 A | 2/2016 |
| CN | 205209917 U | 5/2016 |
| CN | 106483044 A | 3/2017 |
| JP | 052053 U | 1/1993 |
| JP | 06094594 A | 4/1994 |
| JP | 2001074630 A | 3/2001 |
| WO | 2015/130597 A1 | 9/2015 |

OTHER PUBLICATIONS

Extended European Search Report dated Mar. 28, 2019; Appln. No. 17854675.0.
The First Chinese Office Action dated Jul. 30, 2018; Appln. No. 201710698199.3.
Shuling Chen et al; "Experiment Study on Surface Tension of Several Alcohol Aqueous Solutions", Journal of Beijing Jaotong University, vol. 32, No. 1, Feb. 2008, pp. 112-116.
Guobo Zhuang, et al; "Several Methods of Measuring Surface Tension", Journal of Jiangsu Radio and Television University, No. 4, Dec. 31, 1994, 6 pages.
International Search Report dated Dec. 11, 2017, PCT/CN2017/101347.
2nd Examination Report Australia, Appln. No. 2017333529; dated Dec. 19, 2019.

MAGNETIC POLE PART, FIBER-REINFORCED MATERIAL, TEST APPARATUS THEREFOR, AND CONTROL METHOD FOR TEST APPARATUS

This application is the national phase of International Application No. PCT/CN 2017/101347, titled "MAGNETIC POLE PART, FIBER-REINFORCED MATERIAL, TEST APPARATUS THEREFOR, AND cONTROL METHOD FOR TEST APPARATUS", filed on Sep. 12, 2017, which claims the priority to Chinese Patent Application No. 201610877233.9, titled "MAGNETIC POLE PART, FIBER-REINFORCED MATERIAL, TEST APPARATUS THEREFOR, AND CONTROL METHOD FOR TEST APPARATUS", filed on Sep. 30, 2016 with the State Intellectual Property Office of People's Republic of China, which are incorporated herein by reference in their entireties.

TECHNICAL FIELD

The present disclosure relates to the technical field of adhesive filling and curing in a molding process for protecting a magnetic pole of a permanent magnetic machine, and in particular, to a magnetic pole member, a fiber-reinforced material, a test apparatus and a control method therefor.

BACKGROUND

The permanent magnetic machine is an electromagnetic apparatus which performs mutual conversion between mechanical energy and electric energy with magnetic field as a medium, and is widely applied to various scenes. Magnetism of the permanent magnetic material of the permanent magnetic machine is one of the most important factors which influence the power generation performance of the permanent magnetic machine.

Reference is made to FIG. 1, which is a schematic diagram of a partial structure of a permanent magnetic pole of a permanent magnetic machine.

The permanent magnetic pole of the permanent magnetic machine includes a magnetic yoke wall 1, pressing bars 2 and a magnetic pole member 3. The magnetic yoke wall 1 is generally a cylindrical wall. The preprocessed pressing bars 2 are installed at an inner peripheral wall of the magnetic yoke wall 1 through fasteners such as bolts 4 and the like. The pressing bars 2 extend along the axial direction, and are uniformly distributed along the circumferential direction. After positions of the pressing bars 2 are fixed, a magnetic pole member 3 is pushed along the axial direction into a corresponding position between adjacent pressing bars 2. The cross section of the pressing bars 2 is generally a trapezoid. Namely, two side walls of a pressing bar 2 are inclined surfaces of the trapezoid. The magnetic pole member 3 is confined along a radial direction inside a trapezoidal space formed between the adjacent pressing bars 2. The magnetic pole member 3 is a permanent magnetic material. The major component of the permanent magnetic material is neodymium iron boron. Iron and neodymium in the neodymium iron boron is apt to be oxidized, which causes a change in magnetic performance. Therefore, a protective coating 6 is generally poured at a surface of the magnetic pole member 3, so as to prevent an influence of an external environment on the magnetic properties of the magnetic pole member 3 as much as possible, and hereinafter a specific process is described in detail.

First, a vacuum bag is installed at an inner wall of the magnetic yoke wall 1. The vacuum bag and the magnetic yoke wall 1 form a mold cavity. The pressing bars 2 and the magnetic pole member 3 are wrapped in the mold cavity. Generally, a layer of fiber-reinforced material is laid in advance at the surface of the pressing bars 2, so as to increase strength of the protective coating 6. Afterwards, the mold cavity is pumped to vacuum by a vacuum pump, so that the reinforced material is tightly pressed against at the surface of the pressing bars 2 and the magnetic pole member 3, and residual air between the magnetic pole member 3 and the magnetic yoke wall 1 is extracted. Then, the adhesive (resin type) is poured in vacuum into the mold cavity. The resin, when flowing along the axial direction from one end to the other end of the mold cavity, impregnates the fiber-reinforced material, fills a gap between the magnetic pole member 3 and the magnetic yoke wall 1 and a gap between the magnetic pole member 3 and the pressing bars 2, and covers the surface of the pressing bars 2 and the magnetic pole member 3. After filling the whole mold cavity, spacing, and gaps, the adhesive wets and impregnates the contact surface to solid objects in the mold cavity, so as to control a curing process for forming the protective coating of the resin-based reinforced material.

The protective coating 6 has a good protection effect on the magnetic pole member 3 to some extent. In a long-term usage, moisture in ambient environment can cause a chemical change in the fiber and the adhesive matrix, resulting in a decline of a performance of the fiber and the matrix. Moisture can enter, via diffusion, the interface between the protective coating 6 and the pressing bar 2, and the interface between the protective coating 6 and the magnetic pole member 3, causing exfoliation of the mutually bonded interface and a decline of mechanical performance of the material. Under an environment where temperature and humidity change, mismatching deformation and mismatching stress are generated in the adhesive due to expansion and contraction, influencing structural deformation and causing damages to the material.

In a molding process, it is inevitable that there are many defects such as micro-cracks at the bonded interface. Each micro-crack has a different state of stretching and shrinking in heating expansion and cooling contraction, resulting in inconsistency of the coefficient of thermal expansion during heating and cooling. The crack or the exfoliation area gradually increases, reducing a mechanical performance of the protective coating 6. In usage, water molecules are apt to first invade into free spaces and microscopic defects, such as holes, bubbles, and micro cracks, inside the protective coating 6, and hence moisture is absorbed fast at an early stage.

Therefore, how to improve a service life of the protective coating at the surface of the magnetic pole member of the machine is an urgent technical problem to be solved by those skilled in the art.

SUMMARY

To address the above technical issue, a test apparatus for member wettability research is provided according to the present disclosure, including:

a container, where an adhesive placing cavity configured to hold an adhesive is provided inside the container;

a positioning member, configured to position a tested member at the adhesive placing cavity of the container, so that a part of the tested member is placed in the adhesive;

an adhesive heating member, arranged inside or outside the adhesive placing cavity, and configured to heat the adhesive;

an adhesive temperature sensor, configured to measure a temperature of the adhesive inside the adhesive placing cavity;

a collecting member, configured to acquire information of a meniscus formed between the tested member and the adhesive; and a controller, configured to control operation of the adhesive heating member to cause the adhesive to be at different temperatures, calculate, according to the acquired information of the meniscus at the different temperatures, corresponding contact angles between the tested member and the adhesive, and acquire a temperature of the adhesive corresponding to a smallest contact angle.

Thereby, when the test apparatus according to the present disclosure is used, the tested member such as a fiber-reinforced material or a magnetic pole member can first be placed at an appropriate position of the adhesive placing cavity via the positioning member. The adhesive placing cavity can hold a certain amount of adhesive. The adhesive temperature sensor can feed a real-time adhesive temperature back to the controller. The controller can control the adhesive heating member to be turned on or off, so that the adhesive is at the different temperatures. And the collecting member can acquire information of the meniscus at the different temperatures, calculate the corresponding contact angles, and finally display the adhesive temperature corresponding to the smallest contact angle.

The contact angles, at different adhesive temperatures, between the tested member and the adhesive can be acquired by the test apparatus. The test shows that contact angles between the same tested member and the adhesive are different at the different adhesive temperatures, and contact angles of different tested members are different at the same adhesive temperature. The adhesive temperature corresponding to a best contact angle of a certain tested member can be determined based on the test apparatus. Generally, the smaller the contact angle is, the better a wetting effect of a liquid on a solid is.

Namely, the best adhesive temperature of the fiber-reinforced material and the magnetic pole member, in a glue-injection process of a molding process for protecting the magnetic pole of a permanent magnetic machine, can be acquired in advance via the test apparatus according to the present disclosure, which facilitates acquiring data of critical factors which influence control of molding quality of the protective coating.

In addition, a magnetic pole member is provided according to the present disclosure, including a magnetic body, and further including:

a member heater, arranged inside the magnetic body, and configured to heat the magnetic body; and a member temperature sensor, configured to measure a surface temperature of the magnetic body.

Figure 1:
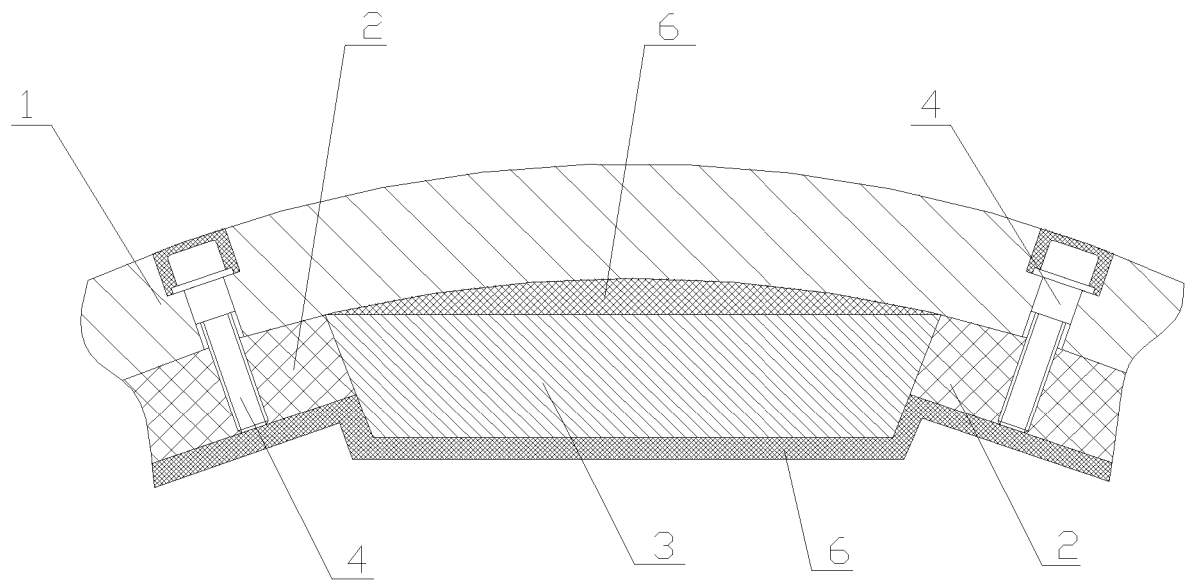
FIG. 1 is a schematic diagram of a partial structure of a permanent magnetic pole of a permanent magnetic machine.

| Reference signs in FIG. 1: | |
|---|---|
| 1: magnetic yoke wall; | 2: pressing bar; |
| 3: magnetic pole member; | 4: bolt; |
| 6: protective coating. | |

| Reference signs in FIG. 2 to FIG. 8: | |
|---|---|
| 10: container; | 101: bottom wall; |
| 102: peripheral wall; | 103: top wall; |
| 104: outer shell; | 104a: inlet; |
| 104b: outlet; | 105: inner shell; |
| 11: adhesive temperature sensor; | 12: adhesive heating member; |
| 121: heating net; | 121a: wiring end; |
| 122: heating wire; | 13: fiber-reinforced material; |
| 131: transversal fiber; | 132: longitudinal fiber; |
| 14: suspension frame; | 141: lower positioning rib; |
| 142: middle positioning rib; | 143: upper positioning rib; |
| 15: heating wire; | |
| 15a: access end of an electric wiring end or a liquid pipe; | |
| 16: member temperature sensor; | 161: thermocouple wire; |
| 162: thermocouple temperature sensing section; | |
| 17: weight balancing member; | 18: bracket; |
| 19: lever; | 20: debonding layer; |
| 21: rotating shaft; | 22: controller; |
| 23: inner temperature sensor; | 23a: signal wire; |
| 31: stereo microscope; | 32: image collecting card; |
| 33: camera apparatus; | 40: magnetic pole member; |
| 41: magnetic body; | 100: adhesive. |

DETAILED DESCRIPTION OF THE EMBODIMENTS

To address the technical problem that "there are defects such as micro-cracks in a practical molding forming process, resulting in a decline of the mechanical performance of the protective coating" mentioned in the background, various stages in forming the protective coating is thoroughly studied and explored according to the present disclosure.

The protective coating is mainly molded via a glue-injection process or a curing process. Devices mainly used in the glue-injection process include: a vacuum pump, a pressure regulating valve for the vacuum pump, a buffer tank (an adhesive collector), an adhesive storage tank, and a connecting hose. Under action of the vacuum pump, the adhesive in the adhesive storage tank is gradually injected via the hose into a vacuum bag. As described in the background, the adhesive (resin type) is poured in vacuum into a mold cavity, and the resin, when flowing along an axial direction from one end into the other end of the vacuum bag, impregnates a fiber-reinforced material, fills a gap between a magnetic pole member and a magnetic yoke wall and a gap between the magnetic pole member and pressing bars, and covers the surface of the pressing bars and the magnetic pole member. After filing the whole mold cavity, spacing, and gaps, the adhesive wets and impregnates the contact surface to solid objects in the mold cavity, so as to control the curing process for forming the protective coating of the resin-based reinforced material.

It is discovered according to the present disclosure that, besides the proportion of the adhesive, factors influencing the molding quality of the protective coating includes, for example, the adhesive temperature, and the temperature and material of members being in contact with the adhesive, such as the fiber-reinforced material and the magnetic pole member inside the vacuum bag, which all influence the molding of the protective coating.

With respect to how to set an appropriate adhesive temperature according to a specific fiber-reinforced material and magnetic pole member, so as to further improve the molding quality of the protective coating, thorough studies are carried out according to the present disclosure, and following technical solutions are proposed based on the studies.

For those skilled in the art to better understand the technical solutions according to the present disclosure, hereinafter the present disclosure is further illustrated in detail in conjunction with the drawings and specific embodiments.

Figure 2:
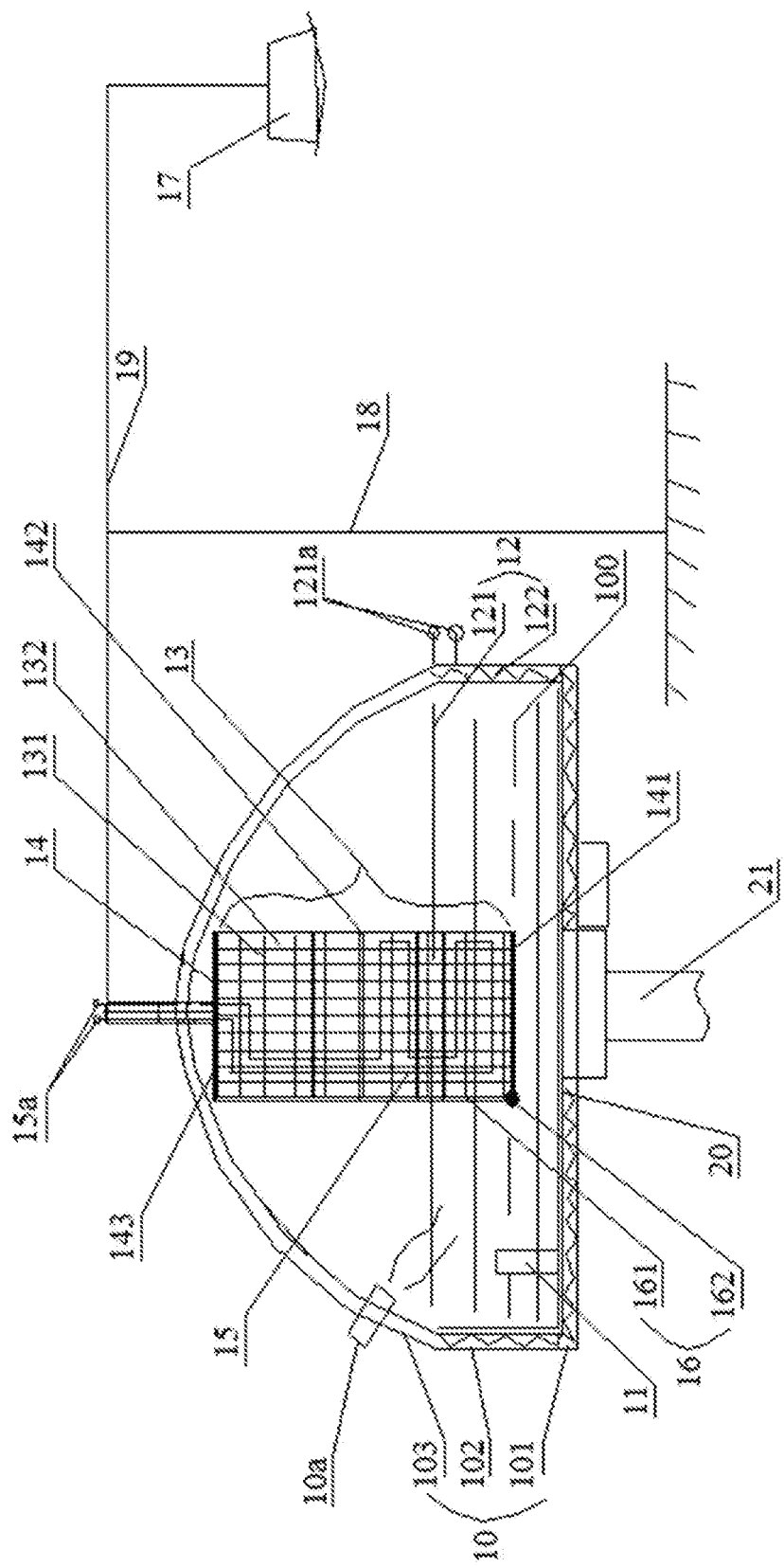
FIG. 2 is a schematic structural diagram of a test apparatus for member wettability research according to an embodiment of the present disclosure.

Reference is made to FIG. 2, which is a schematic structural diagram of a test apparatus for member wettability research according to an embodiment of the present disclosure.

A test apparatus for member wettability research is provided according to an embodiment of the present disclosure, which includes a container 10. A containing cavity with an enclosed structure is provided inside the container 10. The container 10 is provided with an adhesive placing cavity. The adhesive placing cavity is configured to hold a liquid adhesive 100. The adhesive placing cavity may be a part of the containing cavity in the container 10, or may be independent from the container 10, namely, the adhesive placing cavity being formed by an independent member placed in the containing cavity of the container 10. Generally, the container 10 includes a bottom wall 101, a peripheral wall 102, and a top wall 103, where the three walls enclose the containing cavity for holding the adhesive 100. The adhesive placing cavity is a partial space of the containing cavity.

The test apparatus further includes a positioning member for positioning a tested member at a corresponding position inside the container 10. During the test, a part of the tested member is located within the adhesive placing cavity to be in contact with the adhesive.

The test apparatus further includes an adhesive heating member 12, an adhesive temperature sensor 11, a collecting member, and a controller 22. The adhesive heating member 12 is arranged inside the adhesive placing cavity or outside the adhesive placing cavity, and configured to heat the adhesive 100. Namely, the adhesive heating member 12 may be arranged inside the adhesive placing cavity to directly heat the adhesive 100, or may be arranged outside the adhesive placing cavity to indirectly heat the adhesive 100. The adhesive temperature sensor 11 is configured to measure a temperature of the adhesive 100 inside the adhesive placing cavity. The adhesive temperature sensor 11 may be arranged at the bottom wall 101 of the adhesive placing cavity.

The collecting member is configured to acquire information of a meniscus formed between the tested member and the adhesive. The meniscus is formed at the contacting interface between the tested member and the adhesive, and is a curved surface along which part of the adhesive climbs from a liquid surface of the adhesive to a surface of the tested member.

A contact angle is an angle formed between a tangential direction at an upper edge of the meniscus and a vertical line.

The controller 22 is configured to control the operation of the adhesive heating member 12 to cause the adhesive to be at different temperatures, calculate, according to the information of the meniscus acquired at the different temperatures, corresponding contact angles between the tested member and the adhesive, and acquire an adhesive temperature corresponding to the smallest contact angle.

Thereby, when the test apparatus according to the present disclosure is used, the tested member such as a fiber-reinforced material 13 (such as a glass fiber-reinforced material) or a magnetic pole member 40 can first be placed at an appropriate position of the adhesive placing cavity via the positioning member. The adhesive placing cavity can hold a certain amount of adhesive 100. The adhesive temperature sensor 11 can feed a real-time temperature of the adhesive 100 back to the controller 22. The controller 22 can further control the adhesive heating member to be turned on or off, so that the adhesive is at the different temperatures. And the collecting member can acquire the information of the meniscus at different temperature conditions, calculate the corresponding contact angles, and finally acquire the adhesive temperature corresponding to the smallest contact angle.

The contact angles, at different adhesive temperatures, between the tested member and the adhesive 100 can be acquired by the test apparatus. The test shows that contact angles between the same tested member and the adhesive 100 are different at different adhesive temperatures, and contact angles of different tested members are different at the same adhesive temperature. The adhesive temperature corresponding to a best contact angle of a certain tested member can be determined based on the test apparatus. Generally, the smaller the contact angle is, the better the wetting effect is.

Namely, the best adhesive temperature of the fiber-reinforced material 13 and the magnetic pole member 40, in a glue-injection process of a molding process for protecting the magnetic pole of a permanent magnetic machine, can be acquired in advance via the test apparatus according to the present disclosure, which facilitates acquiring a molding quality of the protective coating.

Based on the above research, it is further discovered according to the present disclosure that the contact angle between the adhesive 100 and the tested member can be further optimized by controlling in wetting a temperature of the fiber-reinforced material and a temperature of the magnetic pole member 40 to achieve a good match between temperatures of a covered material (or the tested member) and the adhesive 100. Hence, the test apparatus is further improved according to the present disclosure.

Further, the test apparatus may include a member heater and a member temperature sensor 16. The member heater is arranged inside the tested member, and configured to heat a covered surface of the tested member. Optionally, the member heater is a heating wire 15 buried in advance in the tested member. The heating wire 15 is configured to heat the tested member. It is taken as an example that the tested member is a glass fiber-reinforced material. The glass fiber-reinforced material includes a fiber body and the heating wire 15. The fiber body includes longitudinal fibers 132 and transverse fibers 131. The longitudinal fibers 132, the transversal fibers 131, and the heating wire 15 are woven together to form the glass fiber-reinforced material. The heating wire 15 may be uniformly wrapped inside the glass fiber-reinforced material. An accessing end 15a of an electrical wiring end sticks out from an upper part of the glass fiber-reinforced material, so as to facilitate connection with an external circuit.

The heating wire 15 is wrapped inside the fibers. Namely, multiple fibers wraps the hating wired 15, so that the heating wire is not exposed, is not in direct contact with the adhesive, and does not change a surface property of the reinforced material, such as roughness and density at the surface. Thereby, the heating wire does not influence the contact condition between the whole fiber-reinforced material and the adhesive.

Figure 4:
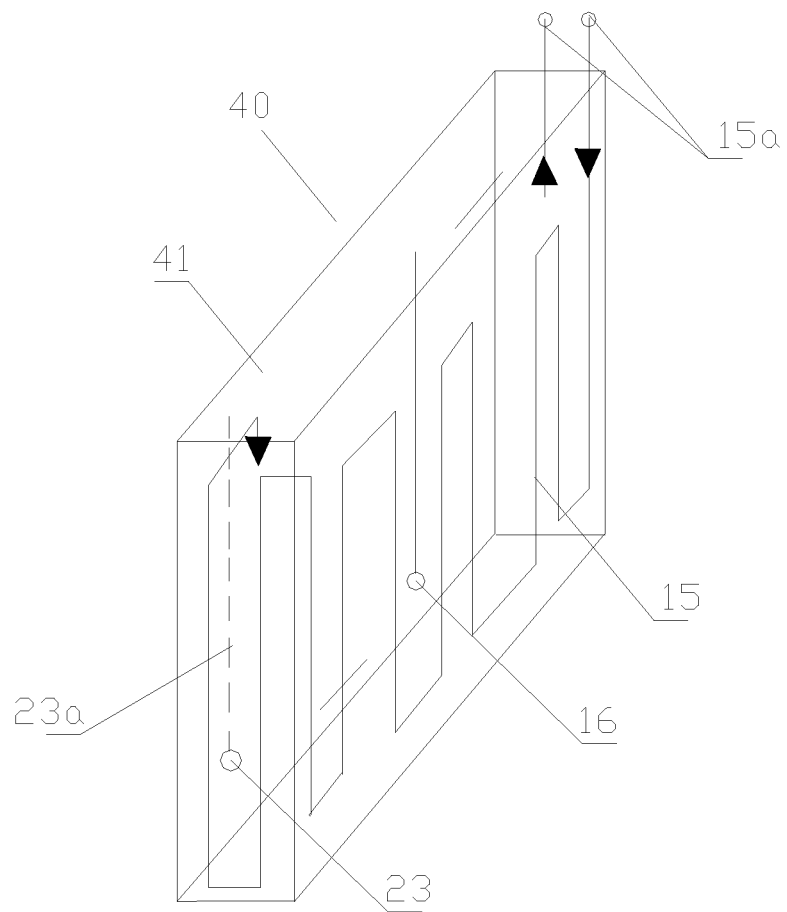
FIG. 4 is a schematic structural diagram of a magnetic pole member.

Reference is made to FIG. 4, which is a schematic structural diagram of a magnetic pole member 40.

Similarly, in a case that the tested member is the magnetic pole member 40, the member heater may be buried inside a magnetic pole material when the magnetic pole member 40 is prefabricated. Specifically, the magnetic pole member may include a magnetic body 41. The magnetic body 41 is mainly made of metallurgical powder, and has the same composition as conventional magnetic steel, which is not further introduced herein. The magnetic pole member 40 according to the present disclosure may further include the aforementioned member heater and the aforementioned member temperature sensor. The member heater is arranged inside the magnetic body 41 to heat the magnetic body 41.

The member heater may be a heating wire, a heating rod or a heating tube. The member heater is buried inside the magnetic body 41 when the magnetic body 41 is prefabricated, namely, when the metallurgical powder is pressed.

It is understood that, in order to heat the outer surface of the magnetic body 14 as uniformly as possible, the heating wire or the heating tube may be uniformly formed inside the magnetic body 41 and arranged close to the surface of the magnetic body 41, facilitating heating the magnetic body 41 rapidly. The access end 15a of the electrical wiring end or the liquid tube extends from inside to outside of the magnetic body 41 to be connected to an external heating source.

The member heater forms a continuous electric heating element inside the magnetic body 41, which facilitates a uniform distribution of the generated heat. Or the member heater is a net structure, formed by an electric heating element, inside the magnetic body 41. The net structure starts fast to generate heat, and facilitates a uniform distribution of the generated heat. The net structure may constitute multiple paths of parallel connection.

The member heater may be arranged inside the magnetic body 41 in various manners, which are not numerated herein.

The outer surface of the member heater may be covered by an insulation material, so as to prevent conduction between the member heater and the magnetic body 41.

Further, the magnetic body 14 may be provided with a humidity sensor inside. A humidity sensing member of the humidity sensor is formed at the surface of the magnetic body 41, and a wire of the humidity sensing member of the humidity sensor is formed inside the magnetic body 41. Inside formation of the wire does not change the surface condition of the magnetic body.

Similarly, the member temperature sensor 16 is configured to measure a surface temperature of the tested member. The member temperature sensor 16 may be arranged at the surface of the tested member, and also may be buried inside the tested member.

Similarly, the fiber-reinforced material and the magnetic pole member 40 are taken as an example, where the member temperature sensor is configured to measure a surface temperature of the fiber body or the magnetic body 41. Specifically, the temperature sensor includes a temperature sensing part and a conducting part. The temperature sensing part is configured to measure a temperature, and at least part of the temperature sensing part abuts against an outer surface of the fiber body or the magnetic body 41. The conducting part is buried inside the magnetic body 41, one end of the conducting part is connected to the temperature sensing part, and another end of the conducting part is exposed to the outside of the magnetic body 41.

The controller 22 further controls the operation of the member heater so that the tested member is at different temperatures, acquires information of the meniscus for different temperature gradients of a bonding layer between the tested member and the adhesive, calculates corresponding contact angles according to the information of the meniscus, and acquire a temperature of the tested member and an adhesive temperature, corresponding to the smallest contact angle.

Specifically, an end portion of the aforementioned conducting part of the temperature sensor, which is connected to outside, may stick out from inside of the tested member to be connect to the controller 22. Specifically, the member temperature sensor 16 may be a thermocouple sensor, including a thermocouple wire 161 and a thermocouple temperature sensing section 162. The thermocouple temperature sensing section 162 measures a surface temperature of the tested member located in the adhesive.

In the embodiment, the member temperature sensor 16 can transfer the surface temperature of the tested member to the controller 22, and the controller 22 may control the member heater buried in the tested member to heat the tested member. Test shows that the same tested member at the same adhesive temperature has different contact angles at different surface temperatures of the tested member. Taking an example that the tested member is a glass fiber-reinforced material, the following table shows the contact angles between the glass fiber-reinforced material and the adhesive 100 at the same adhesive temperature and different covered-surface temperatures.

TABLE 1

Contact angles at different temperatures of the glass fiber-reinforced material and the adhesive

| | | | | |
|---|---|---|---|---|
| Surface temperature of the glass fiber-reinforced material (° C.) | 20 | 30 | 40 | 50 |
| Adhesive temperature (° C.) | 30 | 30 | 30 | 30 |
| Contact angle (°) | 56 | 52 | 40 | 34 |

Further, the test apparatus in the aforementioned embodiments may include an inner temperature sensor 23, which is arranged inside the tested member and configured to measure an inner temperature of the tested member. A signal output end of a signal wire 23a of the inner temperature sensor 23 may be connected to a signal input end of the controller, and the controller display on a display screen a temperature detected by the inner temperature sensor. Thereby, it is facilitated that a tester further learns, according to the temperature detected by the inner temperature sensor, about a heating power of the member heater and a relationship between the heating power of the member heater and the surface temperature of the tested member, and acquires a thermal diffusion rate from inside to the outer surface of the tested member and a degree of an influence from the temperature of the adhesive outside.

Further, the positioning member according to the present disclosure may include a lever 19. The lever 19 can rotate around a fixed fulcrum. The tested member located within the adhesive placing cavity is suspended at one end of the lever 19, and a weight balancing member 17 is arranged at another end of the lever 19. The weight balancing member 17 is configured to balance a force on the tested member so that the lever 19 is at a balanced position.

Optionally, the lever according to the present disclosure is an equal arm lever 19, so as to facilitate following calculations. It should be noted that forced on the tested member within the adhesive placing cavity include gravity and a buoyancy force from the adhesive 100, and the buoyancy force points upward. With respect to the equal arm lever 19, the weight of the weight balancing member 17 is a vector sum of the buoyance force and a wetting force on the tested member, in a case that the lever 19 is balanced. The weight balancing member 17 may be a weight block marked with a specific value.

For a tested member with a small weight, a suspension frame is generally further arranged. The fiber-reinforced material is positioned flatly on the suspension frame. An upper end of the suspension frame 14 is connected to the lever 19. Specifically, the suspension frame at least includes an upper positioning rib 143, a lower positioning rib 141 and a middle positioning rib 142, where the fiber-reinforced material is positioned flatly via the positioning ribs. During test, a surface contact section between the fiber-reinforced material 13 and the adhesive 100 is located between the lower positioning rib 141 and the middle positioning rib 142. Namely, the lower position rib 141 is generally located at an end of the fiber-reinforced material 13 and submerged within the adhesive 100.

Figure 3:
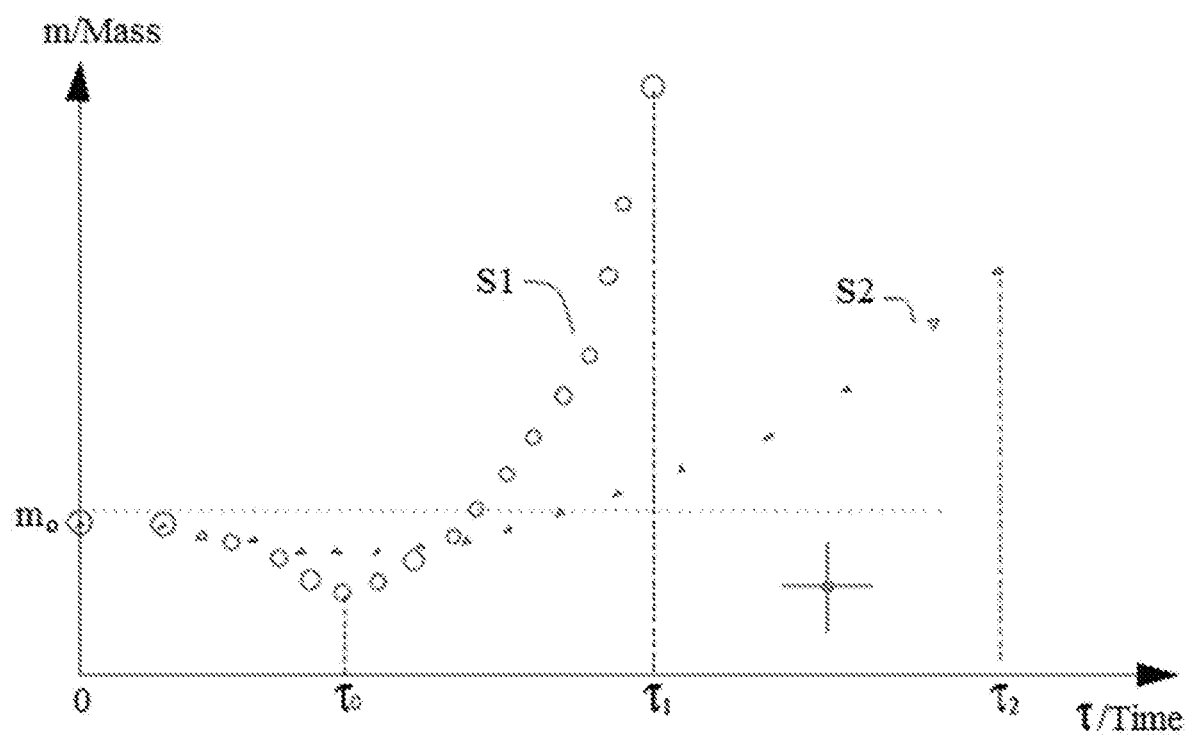
FIG. 3 is curves of variations of a weight balancing member against time at different adhesive temperatures.

Reference is made to FIG. 3, which are curves of variations of the weight balancing member against time at different adhesive temperatures.

Experiments show that, in a gradual wetting process of the tested member, the lever 19 is not always balanced, and variations of the weight balancing member 17 are shown in FIG. 3 to keep a balance of the lever 19. In FIG. 3, a curve S1 is a variation curve corresponding to adhesive temperature $T_B$, a curve S2 is a variation curve corresponding to adhesive temperature $T_A$, and $T_A$ is greater that $T_B$. The weight of the weight balancing member 17 first decreases, and then gradually increases until reaching a fixed value. Namely, the viscosity of the adhesive 100 in the adhesive placing cavity is changing. Taking the curve S1 as an example, the viscosity decreases during the period from 0 to $\tau_0$. At the moment when the viscosity of the adhesive decreases to the smallest value, it reaches a best state for flowing under which it is best for wetting and impregnation to reinforce the gap of the material and the surface of the magnetic member; and the viscosity increases during the period from $\tau_0$ to $\tau_1$. From this figure, it can be seen that after the mass of the weight balancing member reaches $m_0$ again, the changing rate per unit of the weight of the weight balancing member is accelerated, namely, the viscosity of the adhesive increases rapidly.

Moreover, it can be seen from the curves drawn by the above test that $\tau_2$ is greater than $\tau_1$, namely, the curve S2 shows that a moment when the viscosity of the adhesive decreases to a minimum value is later than that of S1. That is to say, the higher the adhesive temperature is, the later the moment when the viscosity decreases to the minimum value is.

The above test shows that at a certain adhesive temperature, adhesive injection, gap filling, impregnation of the glass fiber cloth, and wettability of the permanent magnetic pole member 40 are completed within a permitted time interval, during which the viscosity increases and fluidity decreases, and thereby a reasonable glue-injection time is acquired.

In the above embodiments, the test apparatus may further include a bracket 18 supported on the ground or the test stand. The fixed fulcrum of the lever 19 is formed at the top of the bracket 18. Namely, the lever 19 is supported on the top of the bracket 18, and can rotate around the top of the bracket 18.

The lever 19 and the bracket 18 are arranged outside the adhesive placing cavity, and are convenient to install. The lever 19 may be connected via a pull cord or a pull rod to the tested member. Namely, a lower end of the pull cord or the pull rod is connected to an upper portion of the tested member, and an upper end of the pull cord or the pull rod goes through a via hole at the top wall of the adhesive placing cavity, and is connected to a corresponding end of the lever 19.

The test apparatus according to the aforementioned embodiments may further include a power member. The power member is configured to drive the container 10 to rotate around its vertical central axis. Specifically, the bottom wall 101 of the container 10 may be fixed on a platform, and the power member drives the platform to rotate, thereby achieving rotation of the container 10. The power member may be a motor. Because a volume of the test apparatus is not large, power of the motor may be small and can be driven by a battery. It is appreciated that the power member may be members such as a hydraulic pump and a motor, and a specific structural form of the power member is not limited according to the present disclosure, as long as rotation of the container 10 can be achieved. Although FIG. 2 shows only a rotating shaft 21 connected to the power member and does not show the power member, those skilled in the art can still appreciate the technical solution according to the present disclosure.

Thereby, in the initial stage, the power member can drive the container 10 to rotate, and the adhesive 100 and the curing agent within the container 10 can be uniformly mixed. Then, the tested member is positioned at an appropriate position in the adhesive placing cavity for a wettability test.

Figure 7:
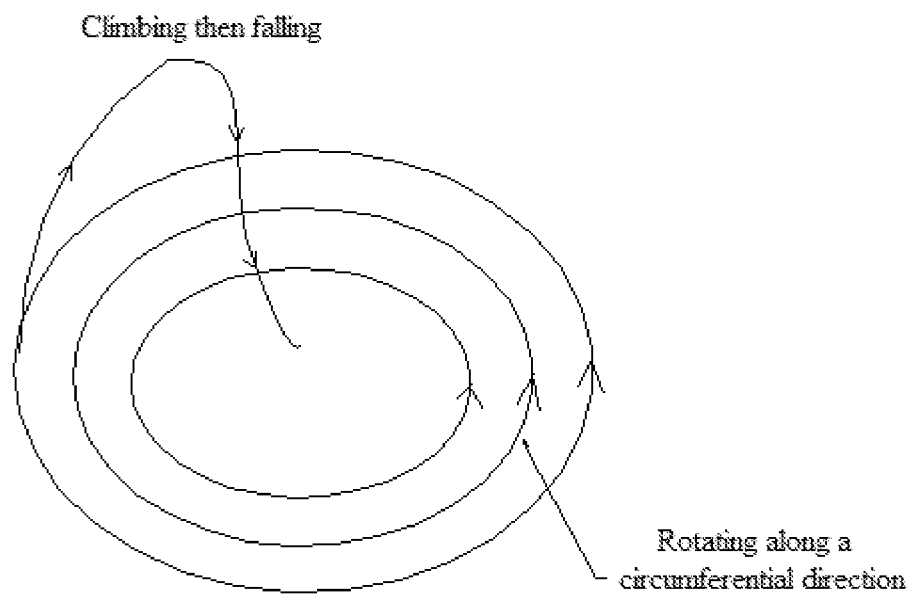
FIG. 7 is a schematic diagram of flowing directions when mixing adhesive in a case that a top wall is a dome.

Reference is made to FIG. 2 again in conjunction with FIG. 7, where FIG. 7 is a schematic diagram of flow directions of the adhesive 100 when it is mixed in a case that the top wall is a dome.

An inner surface of the top wall of the container 10 is dome-shaped. When the mixture of the adhesive 100 climbs to a predetermined position of the dome-shaped inner wall, it will fall down to the inside of the adhesive placing cavity under gravity. Namely, the flowing form of the adhesive 100 has circumferential rotation superposed with upward and downward reciprocating rolling, which facilitates rapid mixing of the adhesive and the curing agent.

In an optional embodiment, the adhesive heating member 12 is a heating net uniformly distributed inside the adhesive placing cavity, so as to facilitate heating the adhesive 100 rapidly and uniformly.

It should be appreciated that the adhesive heating member 12 may also be a heating wire 122 arranged inside an inner wall of the container 10. A wiring end of the heating wire 122 and a wiring end 121a of the heating net 121 are exposed to the outside of the container 10.

The heating net 121 arranged inside the adhesive placing cavity or the heating wire 122 arranged in the inner wall of the container 10 may be arranged alternatively or both, thereby complementing each other.

In the aforementioned embodiments, the information of the meniscus acquired by the collecting member of the test apparatus may be an image or a video of the meniscus. The signal output port of the collecting member is connected to the signal input end of the controller 22, so as to transmit the image or the video of the meniscus to the controller 22. The controller 22 performs image processing or video processing on the image or the video of the meniscus, to acquire the contact angle between the adhesive and the tested member.

In the embodiment, the collecting member can acquire the contact angle accurately and rapidly, improving efficiency of the test and analysis accuracy of a test result.

Figure 5:
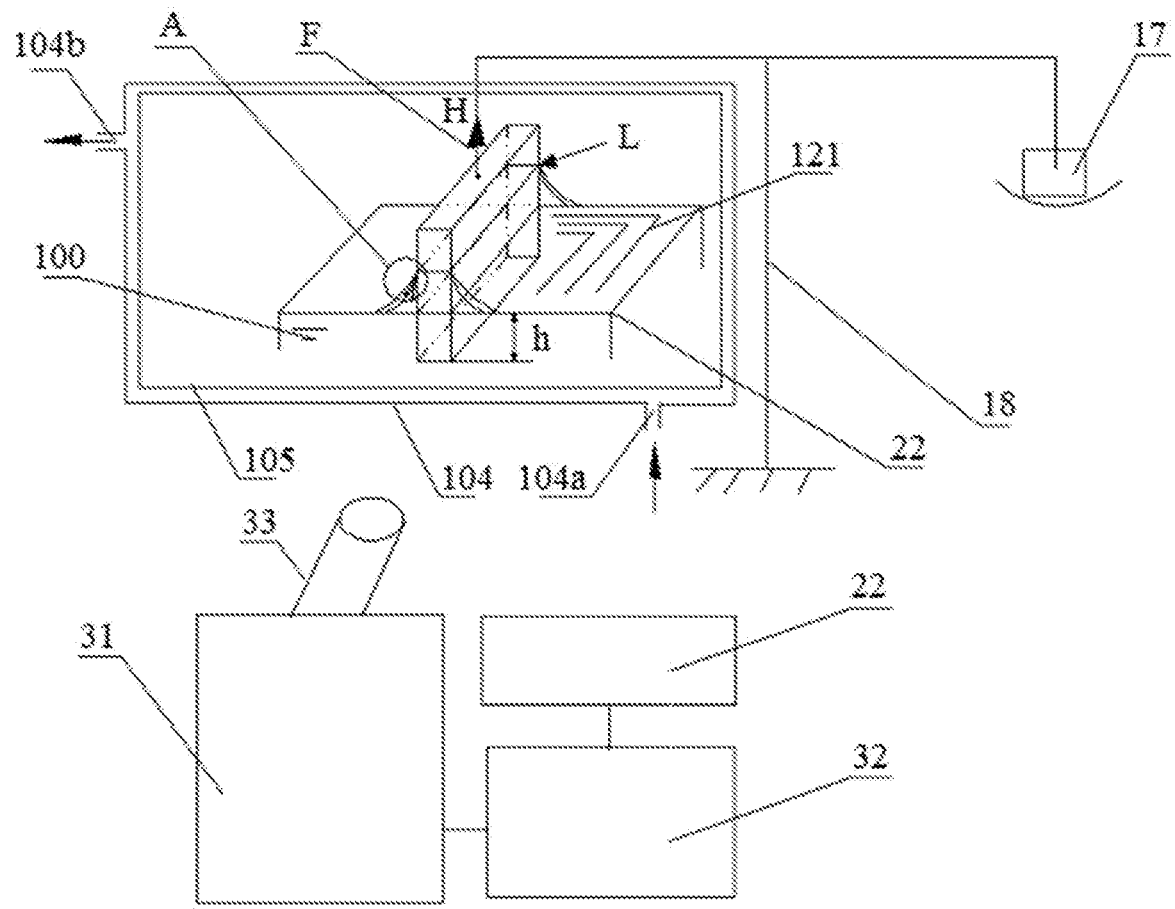
FIG. 5 is a schematic structural diagram of a test apparatus according to another embodiment of the present disclosure.
Figure 6:
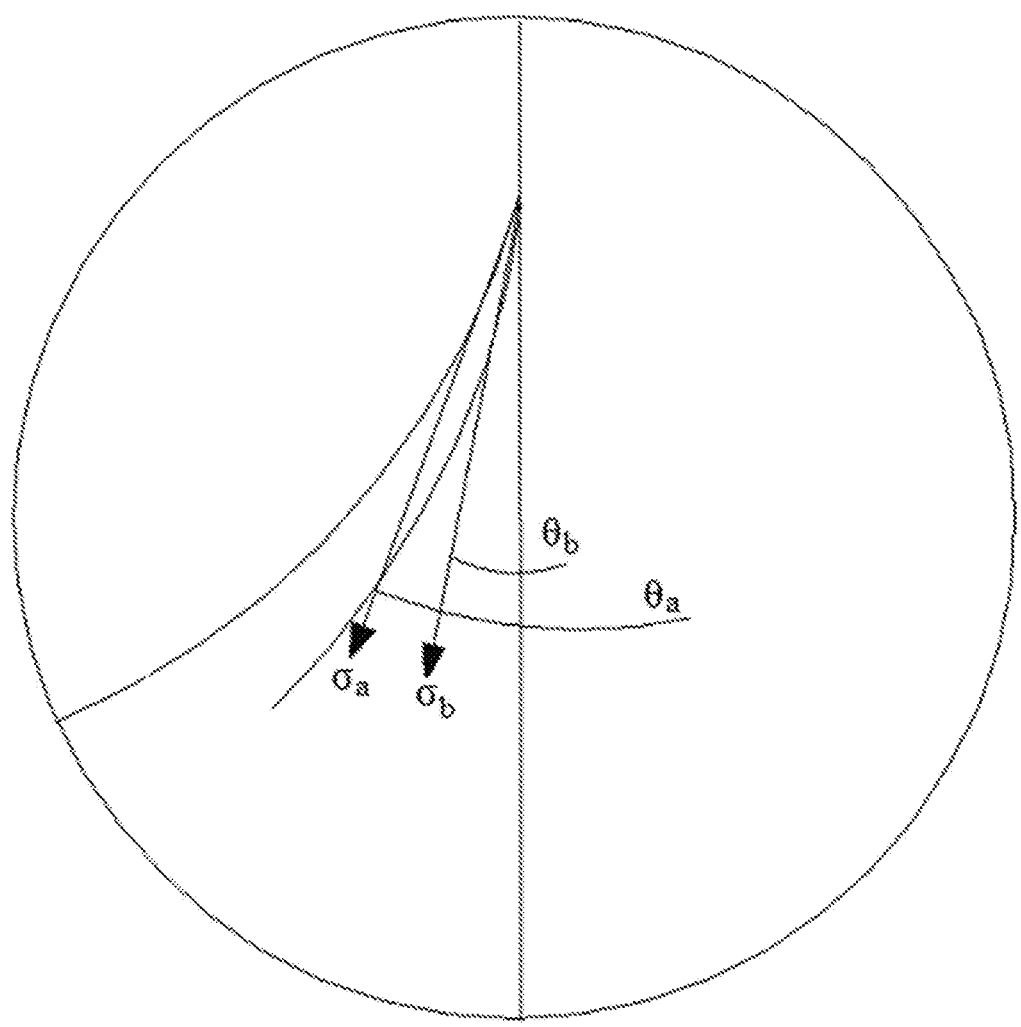
FIG. 6 is an enlarged diagram of region A in FIG. 5.

Reference is made to FIG. 5, which is a schematic structural diagram according to another embodiment of the present disclosure. FIG. 6 is an enlarged diagram of section A in FIG. 5.

In a specific embodiment, the collecting member includes a camera apparatus 33, a microscope 31 and an image collecting card 32. The camera apparatus 33 is configured to acquire the image of the meniscus. The microscope 31 is configured to enlarge the image of the meniscus which is acquired by the camera apparatus 33, and may be a stereo microscope. The image collecting card 32 receives the image of the meniscus which is enlarged by the microscope 31, and displays clearly on a display screen the image of the meniscus with a sampling rate determined by the controller 22.

The image collecting card 32 may be a high-speed image collecting card. The camera apparatus may be a CCD camera. The microscope 31 may be a stereo microscope. The CCD camera of the high-speed CCD image collecting system is connected to the stereo microscope 31 and docked with a thermal insulating cavity, to observe and record a test process inside the cavity. The image collecting card 32 transmits the microscopically enlarged image or video of the meniscus between the adhesive 100 (resin) and air to the controller 22. Self-programmed software is configured in the controller 22 for real-time display and collection. An enlargement factor of the image may be adjusted based on test requirements. The dynamic contact angle is acquired by directly measuring an angle of the meniscus.

FIG. 6 shows a static contact angle $\theta_a$, a dynamic contact angle $\theta_b$, and liquid surface tensions $\sigma_a$ and $\sigma_b$, of the magnetic pole member 40 at temperatures $T_A$ and $T_B$. The static contact angle is an angle between a tangential line of the meniscus and a vertical 5 direction when the solid-state tested member stands in the liquid vertically, and the meniscus appears at two sides of the solid-state tested member due to capillary action. In a case that a thin plate is inserted downwards into (or in an opposite direction) a liquid sink at a constant speed v, the meniscus lowers and eventually keeps a stable shape, and the corresponding contact angle is the dynamic contact angle. The dynamic contact angle is greater that the static contact angle, and increases with the speed v of the thin plate increasing. Generally, a width of a side face (a left side face and a right side face) of the magnetic pole member 40 is 10 times or more of a width of a front face (or a back face), and an influence of the boundary of the front face (or the back face) of the magnetic pole member 40 on the meniscus of the side face (the left side face and the right side face) of the magnetic pole member 40 can be neglected.

According to the present disclosure, the left side face and the right side face of the magnetic pole member are defined with respect to the member position in FIG. 4, and the left side face and the right side face are two faces having largest surface area.

Part of the magnetic pole member 40 is immersed into the adhesive 100 (resin and curing agent). Another end of the magnetic pole member 40 is suspended on the lever 19. The maximum pulling force required for the magnetic pole member 40 to be out of the liquid surface is measured. The maximum pulling force equals the weight of the magnetic pole member 40 in the air plus the wetting force $L\sigma \cos \theta$ generated by the adhesive 100 at the surface of the magnetic pole member 40, where $\sigma$ is a surface tension of the liquid.

In a case that the magnetic pole member 40 is in an equilibrium state in FIG. 5, $F - Mg = L\sigma \cos \theta - F_b$.

F is the balance pull, with a unit of newton (symbol N).

Mg is the gravity of the magnetic pole member 40, with a unit of newton (symbol N).

$F_b$ is a buoyancy force, with a unit of newton (symbol N).

$L\sigma \cos \theta$ is the wetting force, with a unit of newton (symbol N).

$F_b = \rho g S h$, with a unit of newton (symbol N).

L is a wetted perimeter of a to-be-tested solid, with a unit of meter (symbol m).

$\theta$ is the contact angle, with a unit of degree.

$\sigma$ is the surface tension of the liquid, with a unit of newton per meter (symbol N/m).

$\rho$ is a density of the liquid, with a unit of kilogram per cubic meter (symbol kg/m$^3$).

S is a bottom area of the solid, with a unit of square meter (symbol m$^2$).

H is a depth at which the solid is immersed into the liquid, with a unit of meter (symbol m).

Thereby, the contact angle is calculated by a method of measuring a force. When the three-phase contact line moves forward (by uniformly adding weights with a small mass) and backward (by uniformly removing weights with a small mass) at a constant rate, the dynamic contact angle is measured as $\theta = \arccos[(F + F_b)/(L \cdot \sigma)]$. The mass of the weight may be fabricated to be small, so as to be added or removed uniformly.

In order to reduce loss of energy in the aforementioned test as much as possible, the container 10 of the aforementioned test apparatus includes an outer shell 104 and an inner shell 105. The adhesive placing cavity is formed inside the inner shell 105. The heat insulating cavity is formed between the outer shell 104 and the inner shell 105. A heat insulating material is contained in the heat insulating cavity.

Or, the outer shell 104 is provided with an inlet 104a and an outlet 104b, which are in communication with the heat insulating cavity. The inlet 104a and the outlet 104b may be connected to an external heat insulating medium loop. The heat insulating medium in the external heat insulating medium loop may be gas or liquid.

The heat insulating material or the heat insulating medium facilitates isolation between the inner shell and an external environment. The heat insulating material and the heat insulating medium are capable to effectively block thermal transmission between inside of the inner shell and the external environment. In particular, the container 10 can greatly improve efficiency of a test, in a case that the test apparatus is applied in an environment with a low temperature.

In addition, the adhesive placing cavity of the container 10 may further include a gas cavity. The gas cavity is located around the adhesive placing cavity or above the adhesive placing cavity. The gas cavity is configured to be filled with the gas which meets the test condition. Thereby, the gas cavity is filled with humid gas or dry gas, so as to simulate a practical processing environment. In particular, the test apparatus can simulate an influence of humidity of the install environment on the adhesive 100, under a practical processing condition that the magnetic pole member 40 enters an install process from a dry preserving environment, so as to verify an influence of a humid environment on an adhesive adhesion force and the contact angle.

In order to facilitate a tester to directly observe the wetting condition of the adhesive 100 and the tested member in the container 10, the container 10 may be entirely or partially made of a transparent material.

It should be appreciated that, in order to reduce a friction between the mixture of the adhesive 100 and the inner wall of the adhesive placing cavity, a debonding layer 20 formed by a debonding material may be arranged at the inner wall of the adhesive placing cavity.

The test apparatus according to the present disclosure can adjust a surface energy of the tested material by heating the tested member (such as the glass fiber-reinforced material and the magnetic pole member 40), adjust the temperature, the viscosity and the surface energy of a liquid such as the adhesive in contact with the tested member, and search for a temperature at which the adhesive 100 wets the tested member well. Namely, the test apparatus according to the present disclosure is capable to actively control a temperature difference of a solid-liquid contact interface when the magnetic pole member 40 and the glass fiber-reinforced material are individually or collectively in contact with the adhesive.

Generally, the adhesive which adheres to the tested member is the adhesive located within a predetermined distance from the covered surface. In the technical field, the adhesive within the predetermined distance range is defined as a bonding layer c.

Figure 8:
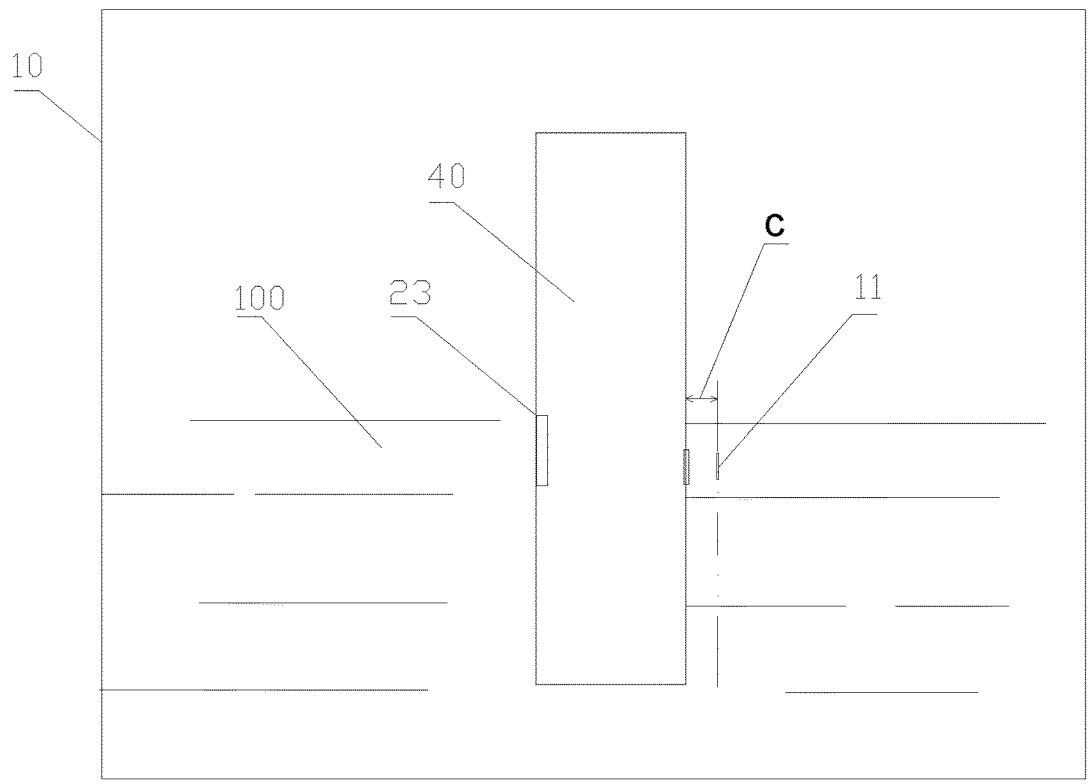
FIG. 8 is a schematic diagram of a test apparatus.

Comprehensive reference is made to FIG. 8, which is a schematic diagram of a test apparatus.

In the aforementioned embodiments, the adhesive temperature sensor 11 may be arranged at a boundary of the bonding layer c formed by the adhesive and the tested member, so as to accurately determine a temperature gradient formed by the tested member and the adhesive.

It should be noted that the temperature gradient is a ratio of a temperature difference between the surface of the tested member and the adhesive to a thickness of the bonding layer. The thickness of the bonding layer is on the order of millimeter, such as within 2 mm.

Figure 9:
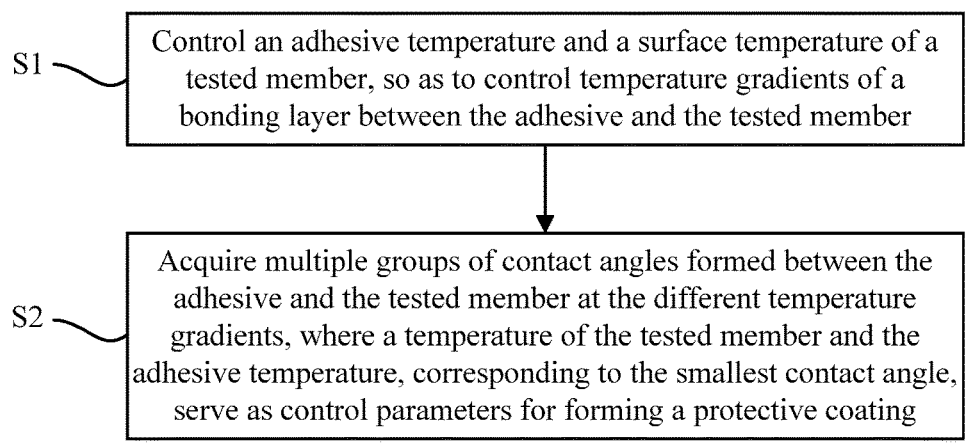
FIG. 9 is a flowchart of a control method according to the present disclosure.

Reference is made to FIG. 9, which is a flowchart of a control method according to the present disclosure.

Based on the aforementioned test apparatus, a control method is provided according to the present disclosure, and the control method specifically includes the following steps.

In step S1, the adhesive temperature and the surface temperature of the tested member are controlled, so as to control the temperature gradients of the bonding layer between the adhesive and the tested member.

In step S2, multiple groups of contact angles formed between the adhesive and the tested member at the different temperature gradients are acquired, and the temperature of the tested member and the adhesive temperature corresponding to the smallest contact angle serve as control parameters for forming a protective coating.

Generally, the temperature of the contact interface of the tested member and the adhesive temperature corresponding to the smallest static contact angle are selected to serve as a temperature of the glue injected into the vacuum bag and a surface temperature of the glass fiber-reinforced material or the magnetic pole member 40 in a practical glue-injection operating condition.

As described above, the contact angles at the different temperature gradients may be obtained by acquiring the information of the meniscus formed between the tested member and the adhesive and calculating the contact angle according to the information of the meniscus.

The result of tests and research herein is instructive to molding technique of the protective coating of the magnetic pole of the permanent magnetic machine. Namely, the aforementioned test method is used to find a best mutual temperature, a novel measuring method thereof, and a dry degree (or a relative humidity), for wettability of the adhesive 100 on the fiber-reinforced material 13 and the magnetic pole member 40 (magnetic steel), and create an adjustable surface state of an objective material necessary for the test conditions.

The beneficial effect of the test apparatus is introduced hereinabove by taking the example that the tested member is the magnetic pole member 40 and the fiber-reinforced material 13. It should be appreciated that the test apparatus may apply to other tested members according to the present disclosure.

Hereinabove the magnetic pole member, the fiber-reinforced material, the test apparatus and the control method therefor are introduced in detail according to the present disclosure. Specific embodiments are applied in the present disclosure to illustrate the principle and embodiments of the present disclosure, and illustration of the above embodiments is to help understand the method and the key concepts of the present disclosure. It should be noted that those skilled in the art may make various improvements and modifications to the present disclosure without deviating from the principle of the present disclosure, and the improvements and the modifications fall within the protection scope claimed by the present disclosure.

The invention claimed is:

1. A test apparatus for member wettability research, comprising:
   a container, wherein an adhesive placing cavity configured to hold an adhesive is provided inside the container;
   a positioning member, configured to position a tested member at the adhesive placing cavity of the container, so that a part of the tested member is placed in the adhesive;
   an adhesive heating member, arranged inside or outside the adhesive placing cavity and configured to heat the adhesive;
   an adhesive temperature sensor, configured to measure a temperature of the adhesive inside the adhesive placing cavity;
   a collecting member, configured to acquire information of a meniscus formed between the tested member and the adhesive;
   a controller, configured to control operation of the adhesive heating member to cause the adhesive to be at different temperatures, calculate, according to the acquired information of the meniscus at the different temperatures, corresponding contact angles between the tested member and the adhesive, and acquire a temperature of the adhesive corresponding to a smallest contact angle,
   a member heater, arranged inside the tested member and configured to heat a covered surface of the tested member; and a member temperature sensor, configured to measure a surface temperature of the tested member in contact with the adhesive, wherein the controller is further configured to control operation of the member heater to cause the tested member to be at different temperatures, acquires the information of the meniscus for different temperature gradients of a bonding layer between the tested member and the adhesive, calculates corresponding contact angles according to the information of the meniscus, and acquires a temperature of the tested member and the temperature of the adhesive corresponding to the smallest contact angle.

2. The test apparatus according to claim 1, wherein the member heater is buried in advance inside the tested member;

the member temperature sensor comprises a temperature sensing part and a conducting part; the temperature sensing part is configured to measure a temperature, and at least a part of the temperature sensing part abuts against the covered surface of the tested member; and the conducting part is buried inside the tested member, one end of the conducting part is connected to the temperature sensing part, and another end of the conducting part extends out of the inside of the tested member to be connected to the controller.

3. The test apparatus according to claim 2, further comprising an inner temperature sensor, which is arranged inside the tested member and configured to detect an inner temperature of the tested member.

4. The test apparatus according to claim 1, wherein the positioning member comprises:

a lever, capable to rotate around a fixed fulcrum, wherein the tested member located within the adhesive placing cavity is suspended at one end of the lever, a weight balancing member is arranged at another end of the lever, and the weight balancing member is configured to balance a force on the tested member so that the lever is at a balanced position, wherein the test apparatus further comprises a bracket (18) supported on ground or a test stand, wherein the fixed fulcrum of the lever (19) is formed at a top of the bracket.

5. The test apparatus according to claim 4, wherein the container comprises a bottom wall, a peripheral wall and a top wall, the bottom wall, the peripheral wall and the top wall encloses a containing cavity, and the adhesive placing cavity is a part of the containing cavity; and the test apparatus further comprises a pull cord or a pull rod, a lower end of the pull cord or the pull rod is connected to an upper portion of the tested member, and an upper end of the pull cord or the pull rod goes through a via hole at the top wall and is connected to a corresponding end of the lever, and wherein the containing cavity of the container further comprises a gas cavity, the gas cavity is located around the adhesive placing cavity or above the adhesive placing cavity, and the gas cavity is configured to be filled with a gas which meets a test condition.

6. The test apparatus according to claim 4, wherein the member heater is a heating wire, the tested member is a fiber-reinforced material which is woven by the heating wire and a plurality of fibers, and the heating wire is wrapped inside the fibers; and the test apparatus further comprises a suspension frame, the fiber-reinforced material is positioned flatly on the suspension frame, and an upper end of the suspension frame is connected to the lever.

7. The test apparatus according to claim 1, further comprising a power member, wherein the power member is configured to drive the container to rotate around a vertical central axis thereof, wherein:

the adhesive heating member is a heating net uniformly distributed within the adhesive placing cavity; and/or the adhesive heating member is arranged inside an inner wall of the container, and an wiring end of the adhesive heating member is exposed to an outside of the container.

8. The test apparatus according to claim 1, wherein the information of the meniscus acquired by the collecting member is an image or a video of the meniscus, a signal output port of the collecting member is connected to a signal input end of the controller and transmits the image or the video of the meniscus to the controller, and the controller performs image processing or video processing on the image or the video of the meniscus to acquire the contact angles between the adhesive and the tested member.

9. The test apparatus according to claim 8, wherein the collecting member comprises a camera apparatus, a microscope and an image collecting card;

the camera apparatus is configured to acquire the image of the meniscus; the microscope is configured to enlarge the image of the meniscus which is acquired by the camera apparatus; and the image collecting card receives the image of the meniscus which is enlarged by the microscope, and displays on a display screen the image of the meniscus with a sampling rate determined by the controller.

10. The test apparatus according to claim 8, wherein the container comprises an outer shell and an inner shell, the adhesive placing cavity is formed inside the inner shell, a heat insulating cavity is formed between the inner shell and the outer shell, and a heat insulating material is contained in the heat insulating cavity; or the outer shell is provided with an inlet and an outlet, which are in communication with the heat insulating cavity, and the inlet and the outlet are connected to an external heat insulating medium loop.

11. The test apparatus according to claim 1, wherein the adhesive temperature sensor is arranged at a boundary of a bonding layer formed by the adhesive and the tested member.

12. The test apparatus according to claim 1, wherein the tested member is a magnetic pole member, and the magnetic pole member comprises:

a magnetic body;

a member heater, arranged inside the magnetic body and configured to heat the magnetic body; and a member temperature sensor, configured to measure a surface temperature of the magnetic body.

13. The test apparatus according to claim 12, wherein the member heater is uniformly formed inside the magnetic body, and is arranged close to a surface of the magnetic body, and wherein the member heater is a liquid heating pipe, or forms a continuous electric heating element inside the magnetic body, or is a net structure formed inside the magnetic body by an electric heating element.

14. The test apparatus according to claim 12, wherein the member temperature sensor comprises a temperature sensing part and a conducting part; the temperature sensing part is configured to measure a temperature, and at least a part of the temperature sensing part abuts against an outer surface of the magnetic body; and the conducting part is buried inside the magnetic body, one end of the conducting part is connected to the temperature sensing part, and another end of the conducting part is exposed to an outside of the magnetic body, and wherein the test apparatus further comprises an inner temperature sensor, arranged inside the magnetic body and configured to detect an inner temperature of the magnetic body.

15. The test apparatus according to claim 1, wherein the tested member is a fiber-reinforced material, and the fiber-reinforced material comprises:

a fiber body;

a member heater, arranged inside the fiber body and configured to heat the fiber body; and a member temperature sensor, configured to measure a surface temperature of the fiber body.

16. The test apparatus according to claim 15, wherein the member heater is uniformly wrapped inside the fiber-reinforced material, and arranged close to a surface of the fiber-reinforced material, and wherein the member heater is a heating wire, the fiber body comprises a plurality of fibers, the heating wire and the fibers are woven together to form the fiber-reinforced material, and the heating wire is wrapped by the fibers.

17. The test apparatus according to claim 15, wherein the member temperature sensor comprises a temperature sensing part and a conducting part; the temperature sensing part is configured to measure a temperature, and at least a part of the temperature sensing part abuts against an outer surface of the fiber-reinforced material; the conducting part is buried inside the fiber body, one end of the conducting part is connected to the temperature sensing part, and another end of the conducting part is exposed to an outside of the fiber body; and the test apparatus further comprises an inner temperature sensor, which is arranged inside the fiber body and configured to detect an inner temperature of the fiber body.

18. A control method for the test apparatus according to claim 1, comprising:

controlling the temperature of the adhesive and the surface temperature of the tested member, so as to control the temperature gradients of the bonding layer between the adhesive and the tested member; and acquiring a plurality of groups of contact angles formed between the adhesive and the tested member at the different temperature gradients, wherein the temperature of the tested member and the temperature of the adhesive, corresponding to the smallest contact angle, serve as control parameters for forming a protective coating.

19. The control method according to claim 18, wherein the contact angles at the temperature gradients are acquired by acquiring the information of the meniscus formed between the tested member and the adhesive, and calculating the contact angles according to the information of the meniscus, wherein the information of the meniscus is an image or a video of the meniscus acquired via a camera apparatus.

* * * * *